United States Patent
Sato

(10) Patent No.: US 7,869,733 B2
(45) Date of Patent: Jan. 11, 2011

(54) IMAGE FORMING APPARATUS

(75) Inventor: Daisuke Sato, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 465 days.

(21) Appl. No.: 12/002,233

(22) Filed: Dec. 14, 2007

(65) Prior Publication Data

US 2008/0292353 A1    Nov. 27, 2008

(30) Foreign Application Priority Data

Dec. 22, 2006    (JP)    ............... 2006-345957

(51) Int. Cl.
*G03G 15/00*    (2006.01)

(52) U.S. Cl. ..................................... 399/82

(58) Field of Classification Search ............... 399/75, 399/77, 82, 83
See application file for complete search history.

(56) References Cited

U.S. PATENT DOCUMENTS

| | | | | |
|---|---|---|---|---|
| 4,711,556 A | * | 12/1987 | Abuyama | 399/87 |
| 4,947,397 A | * | 8/1990 | Sobel et al. | 714/45 |
| 5,832,331 A | * | 11/1998 | Yoshida et al. | 399/43 |
| 5,974,232 A | * | 10/1999 | Kamiya | 709/238 |
| 2001/0035973 A1 | * | 11/2001 | Kusumoto | 358/1.14 |
| 2005/0047813 A1 | * | 3/2005 | Hosoi et al. | 399/87 |

FOREIGN PATENT DOCUMENTS

| | | |
|---|---|---|
| JP | 2005-022099 A | 1/2005 |
| JP | 2006-035533 A | 2/2006 |

\* cited by examiner

*Primary Examiner*—David P Porta
*Assistant Examiner*—Marcus H Taningco
(74) *Attorney, Agent, or Firm*—Holtz, Holtz, Goodman & Chick, PC

(57) ABSTRACT

When discontinuing image forming, the image forming is discontinued after conducting image forming up to the separation of the set in the course of image forming, and then, the jobs in which image forming is not finished including a job in execution are stored in a nonvolatile storing medium before the power shut down and after the discontinuation. When the power is turned on again, image forming is restarted based on the job stored in the nonvolatile storing medium.

10 Claims, 9 Drawing Sheets

FIG. 3

JOB CONTROL INFORMATION 150

| | 150a | 150b | 150c | 150d | 150e | 150f | 150g |
|---|---|---|---|---|---|---|---|
| JOB No. | START INFORMATION | OUTPUT PAGE INFORMATION | OUTPUT SET NUMBER INFORMATION | POST-PROCESSING INSTRUCTION INFORMATION | FINISH INFORMATION | ADDRESS INFORMATION |
| 1 | 1 "STARTED" | 35/35 | 12/12 | 0 "NON" | 1 "FINISHED" | address_Start01,address_End01 |
| 2 | 1 "STARTED" | 48/50 | 7/10 | 1 "STAPLER" | 0 "NOT FINISHED" | address_Start02,address_End02 |
| 3 | 0 "NOT STARTED" | 0/12 | 0/1 | 0 "NON" | 0 "NOT FINISHED" | address_Start03,address_End03 |
| ... | ... | ... | ... | ... | ... | ... |

IMAGE FORMING APPARATUS

This application is based on Japanese Patent Application No. 2006-345957 filed on Dec. 22, 2006 in Japanese Patent Office, the entire content of which is hereby incorporated by reference.

BACKGROUND OF THE INVENTION

The present invention relates to an image forming apparatus that forms an image on a sheet in accordance with image data.

There are known various types of image forming apparatuses each forming an image on a sheet in accordance with image data. For example, a printer for outputting on a sheet image data transmitted from a computer and a copying machine that reads images from a surface of a document to copy them are known. With speeding up and cost reduction, these image forming apparatuses are coming into wide use rapidly among offices and homes.

In offices, a large number of documents are made every day by these image forming apparatuses. A print job to output a large number of sets of documents is frequently executed, under the condition that one set contains plural pages.

Incidentally, especially in the office, there is an occasion where an outputting job has to be discontinued halfway during the output of a large number of documents, because of circumstances of on-the-job hours. When discontinuing printing for a large number of sets, there is considered a method to output again from the beginning on the next day. However, this method is extremely disadvantageous in terms of productivity.

Therefore, there is proposed a technology to restart a discontinued print job, on the next day, from the point in the print job where that print job was discontinued (for example, see "Patent Document" 1" and "Patent Document 2"). In the proposed technology, what should be done before the power of the image forming apparatus is turned off is to cause a print job in execution to be evacuated to a nonvolatile memory where contents of data do not disappear even if the power is turned off. On the evacuated print job, there is information showing the number of outputted sets and outputted pages. After power-on again, image forming is restarted from the page on the way, referring to the print job evacuated to a nonvolatile memory. In other words, the proposed technology is one to make arrangements for the restart before the power is turned off.

Then, when the power is turned on again, an existence of the unfinished print job is notified, and it is possible to select whether to restart the print job that was in execution before the discontinuation from the page on the way, or to restart from the forefront of the set, or to try again form the beginning, and the print job which has been in execution is executed depending on the result of the selection.

In the conventional technology to make arrangements for the restart before the power is turned off, the main purpose is to restart from the printing on the way. Therefore, when the printing is still on the way of the set, the printing is discontinued on the way of the set.

Printing forms include printing of documents in which each set has a meaning, in other words, printing of a booklet that has a meaning only when plural pages are assembled in one, and in particular, a printing form to make a booklet by conducting staple processing and wrapping binding processing. In the printing form of documents where each set has a meaning of this kind, if image forming is discontinued immediately in spite of a halfway portion of the set, printed bundles up to the halfway point of the set before the discontinuation and printed-bundles from the halfway point of the set after the restart up to the end result in a useless outputted object. Further, if this set which resulted in a useless outputted object is not tried to print again, desired number of outputted sets are not obtained.

When the power is turned on again, there is a possibility that the discontinuation is on the halfway point of a set. Therefore, it is essential to urge a user to select whether to restart the print job which was in execution from the page on the way or whether to restart from the forefront of the set. However, a person who uses the image forming apparatus first after repower-on is not necessarily a person who requires the print job which was in execution before the discontinuation. When a person who uses the image forming apparatus first after the repower-on is a different person, it is unclear whether a person who required the print job which was in execution before the discontinuation keeps the prints which became a separated part of the set, or whether the person has scrapped the prints, which causes confusion for selection.

[Patent Document 1] Japanese Patent Publication Open to Public Inspection No. 2005-22099

[Patent Document 2] Japanese Patent Publication Open to Public Inspection No. 2006-35533

SUMMARY

One of embodiments of the invention is an image forming apparatus having therein an image outputting section that forms an image on a sheet for each print job, a nonvolatile storing medium that stores the aforesaid print job and a control device, wherein, when discontinuing image forming halfway for a print job in execution, the control device conducts the control to discontinue after continuing image forming up to the separation of the set (the end of the set), a control to store the print job including results on the way up to the aforesaid discontinuation, after discontinuation of image forming and before turning power off and a control for restart to execute continuously the print job including the results on the way up to the discontinuation stored in the aforesaid nonvolatile storing medium from the aforesaid discontinuation, when the power is turned on again.

BRIEF DESCRIPTION OF THE DRAWINGS

FIG. 3 is a diagram showing an example of the structure of data for print job control information.

DETAILED DESCRIPTION OF THE PREFERRED EMBODIMENT

Embodiments of the invention will be described in detail as follows, based on the drawings.

First Embodiment

Figure 1:
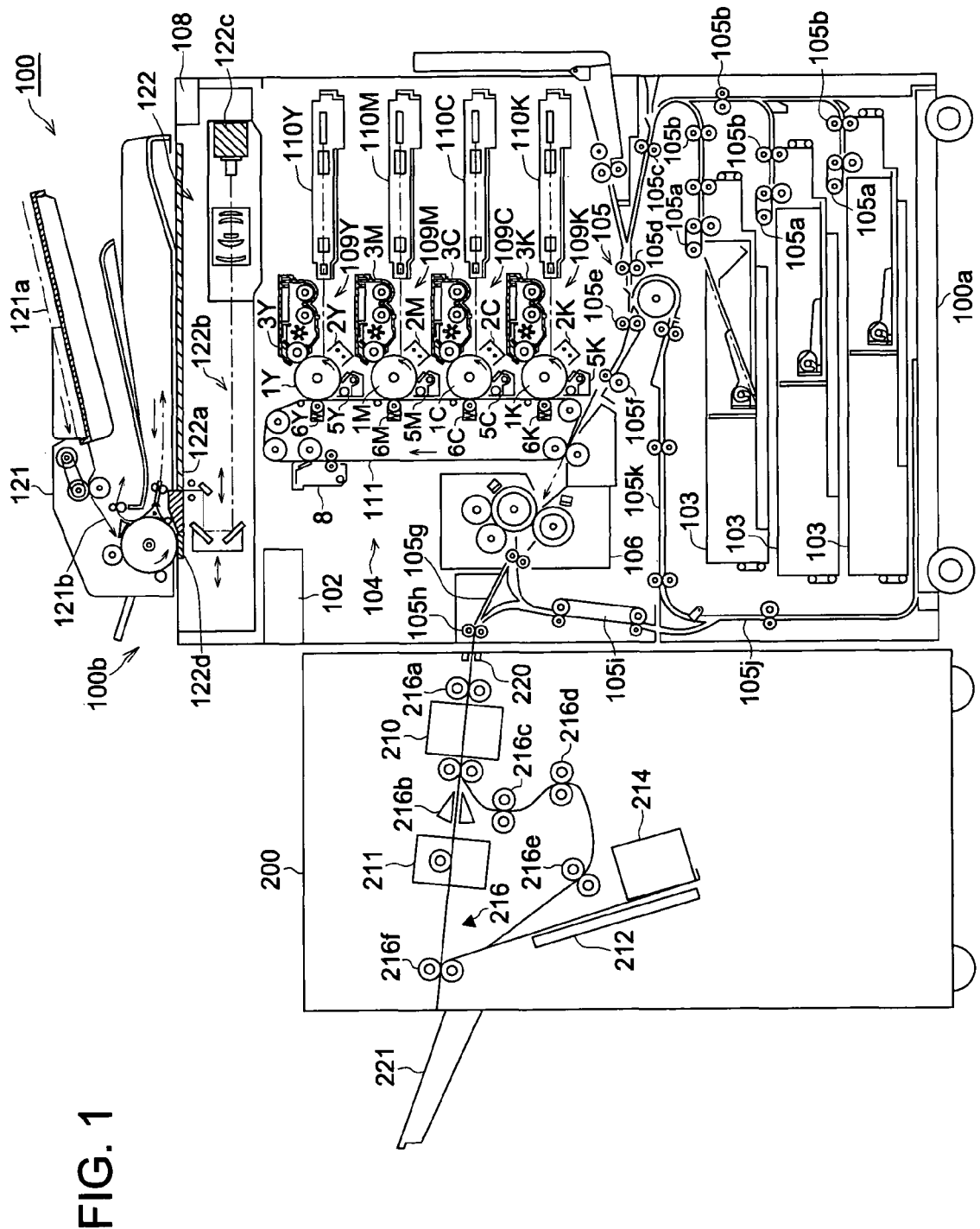
FIG. 1 is a diagram showing the structure of an image forming system relating to the present embodiment.

FIG. 1 is a diagram showing an overall structure of image forming apparatus 100 relating to the present embodiment.

The image forming apparatus 100 forms toner images each having a different color based on optional image data, in an electrophotographic system, and superimposes the toner images each having a different color to form a color image. The image forming apparatus 100 is composed of apparatus main body 100a and of image reading device 100b arranged on the upper portion of the apparatus main body 100a.

By the operation in which operation panel 108 representing a display device arranged on the top surface of the apparatus main body 100a is used, images are read by the image forming device 100b and images are formed on a sheet. Or, by the operation in which image data are outputted from a terminal on the network, images are formed on a sheet.

Bookbinding apparatus 200 is sometimes connected electrically and mechanically to a rear portion of image forming apparatus 100. The bookbinding apparatus 200 is an apparatus that makes sheets outputted from the image forming apparatus 100 into a bundle and conducts post-processing such as stapling processing, shifting processing and punching processing.

The image forming device 100b is composed of document scanning exposure device 122 that reads optically images formed on the surface of a document and converts the images into analog signals and of automatic document feeder (ADF) 121 that feeds a document to the document scanning exposure device 122.

The automatic document feeder 121 is an apparatus for feeding a document to the document scanning exposure device 122, and plural documents placed on document stand 121a are conveyed by conveyance device 121b to the document scanning exposure device 122 one sheet by one sheet.

The document scanning exposure device 122 is composed of platen glass 122a, optical system 122b including a light source such as a xenon lamp, a mirror and a lens, CCD (Charge Coupled Device) image sensor 122c and slit glass 122d.

The optical system 122b conducts scanning exposure on a document placed on platen glass 122a through conveyance by the automatic document feeder 121, or, it gives exposure to a document conveyed on slit glass 122d on a fixed position basis, and causes reflected light that is reflected from the document through irradiation by the light source to form an image on CCD image sensor 122c through a lens, while changing an optical path with a mirror. The CCD image sensor 122c receives an incident light that reflects an image formed on a document surface, to convert it into an analog signal.

Inside the apparatus main body 100a, there are arranged sheet housing section 103 that houses sheets and image outputting section 104 that outputs images on a sheet. Conveyance path 105 through which a sheet is fed to the image outputting section 104 from the sheet housing section 103 is arranged between the sheet housing section 103 and the image outputting section 104. Fixing section 106 is arranged on the rear portion of the image outputting section 104. In the apparatus main body 100a, a sheet is conveyed from the sheet housing section 103 to the image outputting section 104 through conveyance path 105, and an image is formed on the sheet at the image outputting section 104, and then, the image is fixed at the fixing section 106, thus, the sheet is ejected out of the apparatus main body 100a.

Further, in the apparatus main body 100a, there is arranged control device 102 that controls image forming apparatus 100 and bookbinding apparatus 200 on an integrating basis.

Sheet housing section 103 is in a form of a tray or in a form of box, and it can be possible to be drawn out of the apparatus main body 100a along a rail arranged on the bottom portion. In general, plural sheet housing sections 103, 103, 103 . . . are arranged on the apparatus main body 100a so that sheets in various sizes may be housed in various directions.

Conveyance path 105 takes a sheet out of any one of sheet housing section 103, then, causes the sheet to pass through image outputting section 104 and fixing section 106 to convey the sheet into bookbinding apparatus 200. This conveyance path 105 is formed with plural pairs of rollers facing each other, each paired rollers being arranged at prescribed intervals. These paired rollers pinch a sheet and rotate to feed out the sheet in the conveyance direction, thus, the sheet is conveyed to the next paired rollers.

In the vicinity of the sheet housing section 103, there are arranged feed-out rollers 105a and sheet-feed rollers 105b, thus, the sheet is fed from the sheet housing section 103. On the rear portion of sheet-feed roller 105b, there are arranged conveyance rollers 105c, 105d, 105e and registration rollers 105f toward image outputting section 104, whereby, a sheet thus fed is conveyed to the image outputting section 104. At the registration rollers 105f, the sheet thus conveyed hits the registration rollers 105f to be stopped, thereby, the sheet is corrected in terms of its skewing, to be conveyed to the image outputting section 104.

On the rear portion of fixing section 106, there is arranged branching path 105g which conveys a sheet that has passed through fixing section 106 to the sheet ejection side or to sheet circulation side. On the sheet ejection side of the branching path 105g, there is arranged sheet ejection rollers 105h that ejects the sheet conveyed to the sheet ejection side to the outside to convey it into bookbinding apparatus 200.

On the circulation side of the branching path 105g, there are arranged circulation sheet path 105i, reversing conveyance path 105j and sheet re-feeding conveyance path 105k. When forming images on both sides of the sheet, an image is formed on one side of the sheet by image outputting section 104, and then, sheet faces are reversed by reversing conveyance path 105j through circulation sheet path 105i, and the sheet is fed again to conveyance rollers 105e through sheet re-feeding conveyance path 105k.

The image outputting section 104 is equipped with image forming units 109Y, 109M, 109C and 109k for respective colors, semiconductor lasers 110Y, 110M, 110C and 110K for respective colors corresponding respectively to the image forming units 109Y, 109M, 109C and 109K and with endless intermediate transfer belt 111 that is common to respective colors.

Combinations respectively of image forming unit 109Y and semiconductor laser 110Y, image forming unit 109M and semiconductor laser 110M, image forming unit 109C and semiconductor laser 110C, and image forming unit 109K and semiconductor laser 110K form images respectively for yellow (Y) color, magenta (M) color, cyan (C) color and black (K) color in this order by turns.

Image forming unit 109Y is equipped with photoconductor drum 1Y, charging section 2Y, developing section 3Y and cleaning section 5Y, image forming unit 109M is equipped with photoconductor drum 1M, charging section 2M, developing section 3M and cleaning section 5M, image forming unit 109C is equipped with photoconductor drum 1C, charging section 2C, developing section 3C and cleaning section 5C, and image forming unit 109K is equipped with photoconductor drum 1K, charging section 2K, developing section 3K and cleaning section 5K.

Each of photoconductor drums 1Y, 1M, 1C and 1K is a rotatable cylindrical body whose surface is charged uniformly by a charging method of a scorotron type. This surface is exposed to a laser beam emitted from each of semiconductor lasers 110Y, 110M, 110C and 110K, and electric potential on the exposed portion is reduced depending on output intensity of the laser beam, and thereby, an electrostatic latent image is formed.

Each of charging sections 2K, 2M, 2C and 2K gives static charge to the surface of each of photoconductor drums 1Y, 1M, 1C and 1K to charge uniformly. Developing by each of developing sections 3Y, 3M, 3C and 3K is carried out by reversal development employing developing bias wherein AC voltage is superimposed on DC voltage having the same polarity as that of toner to be used, and toner is supplied to form a toner image on the surface of each of photoconductor drums 1Y, 1M, 1C and 1K. Each of cleaning sections 5Y, 5M, 5C and 5K removes toner remaining on each of photoconductor drums 1Y, 1M, 1C and 1K.

Each of semiconductor lasers 110Y, 110M, 110C and 110K scans each of corresponding photoconductor drums 1Y, 1M, 1C and 1K with a laser beam while changing its output intensity, to give exposure to each of photoconductor drums 1Y, 1M, 1C and 1K, and thereby to form an electrostatic latent image of each color. A drive signal having intensity corresponding to each pixel value of image data is inputted in each of semiconductor lasers 110Y, 110M, 110C and 110K to drive it, and thus, a laser beam having output intensity corresponding to the pixel value is outputted.

Intermediate transfer belt 111 rotates on an endless basis. On a surface of the belt, there are arranged photoconductor drums 1Y, 1M, 1C and 1K, and on the reverse side of the belt, there are arranged primary transfer rollers 6Y, 6M, 6C and 6K which respectively face the photoconductor drums 1Y, 1M, 1C and 1K. Further, secondary transfer rollers 7 which face each other to pinch the intermediate transfer belt 111 and cleaning section 8 that removes toner remaining on the belt surface are arranged.

When a primary transfer bias voltage having polarity opposite to that of toner to be used is applied on each of primary transfer rollers 6Y, 6M, 6C and 6K, toner images each having a different color formed respectively on photoconductor drums 1Y, 1M, 1C and 1K are transferred onto the intermediate transfer belt 111 in the order of respective colors (primary transfer), thus, a composite color image is formed.

The intermediate transfer belt 111 on which a composite color image is formed conveys the composite color image to secondary transfer rollers 7 through its rotation, where the color image is transferred collectively onto a surface of the sheet interposed between the secondary transfer rollers 7 (secondary transfer). Toner remaining on the surface of the intermediate transfer belt 111 after the transfer is removed by cleaning section 8.

In fixing section 106, the sheet is heated and pressed, and the color image is fixed on the sheet.

In bookbinding apparatus 200, there are provided punching section 210, shifting section 211, staple stacker 212 and stapler 214. Conveyance paths 216 are arranged in spaces between sheet feeding slot 220, punching section 210, shifting section 211, staple stacker 212 and stapler 214, in the bookbinding apparatus 200. Elevation sheet ejection tray 221 on which sheets are stacked is provided on the outside of the bookbinding apparatus 200 on the sheet ejection side. This elevation sheet ejection tray 221 is provided to be capable of raising and lowering.

The conveyance path 216 is composed of paired rollers which are arranged to face each other. On the line from the sheet feeding slot 220 to the punching section 210, there are arranged sheet supply rollers 216a which pinch the sheet and rotate in the conveyance direction to convey the sheet to the punching section 210. Branching mechanism 216b is arranged on the rear portion of the punching section 210.

The branching mechanism 216b branches a sheet to the shifting section 211 side or to the staple stacker 212 side. On the staple stacker 212 side, rollers 216c, 216d and 216e are arranged on the line toward the staple stacker 212 to convey the sheet to the staple stacker 212.

On the shifting section 211 and on the rear portion of the staple stacker 212, there are arranged sheet-ejection rollers 216f which ejects a sheet on the elevation sheet ejection tray 221.

The punching section 210 bores a hole for filing (punch hole). The shifting section 211 is a processing unit that causes sheets conveyed continuously to be ejected by changing a position of ejection for each set. The stapler 214 conducts processing to staple a bundle of sheets stacked on the staple stacker 212 with a staple.

This bookbinding apparatus 200 may also be provided with a mechanism that conducts saddle stitching, lap center folding, lap three-folding, and wrapping binding.

The control device 102 controls image forming apparatus 100 having the aforesaid structure and bookbinding apparatus 200 on an integrating basis, to conduct image processing, print job generation and print job control, control of image forming for each print job and bookbinding control. In the image processing, analog signals of an image outputted mainly from image reading device 100b are processed to be digital signals. In the print job generation, there are generated job data reflecting contents of operations operated by operation panel 108 representing a display device and reflecting contents of controls outputted from terminals through networks. In the print job control, a print job to be executed is selected and progresses of the print job in execution are monitored. In the control of image forming, control of image forming according to the print job, control of discontinuation of image forming and control of restart of image forming are carried out.

Figure 2:
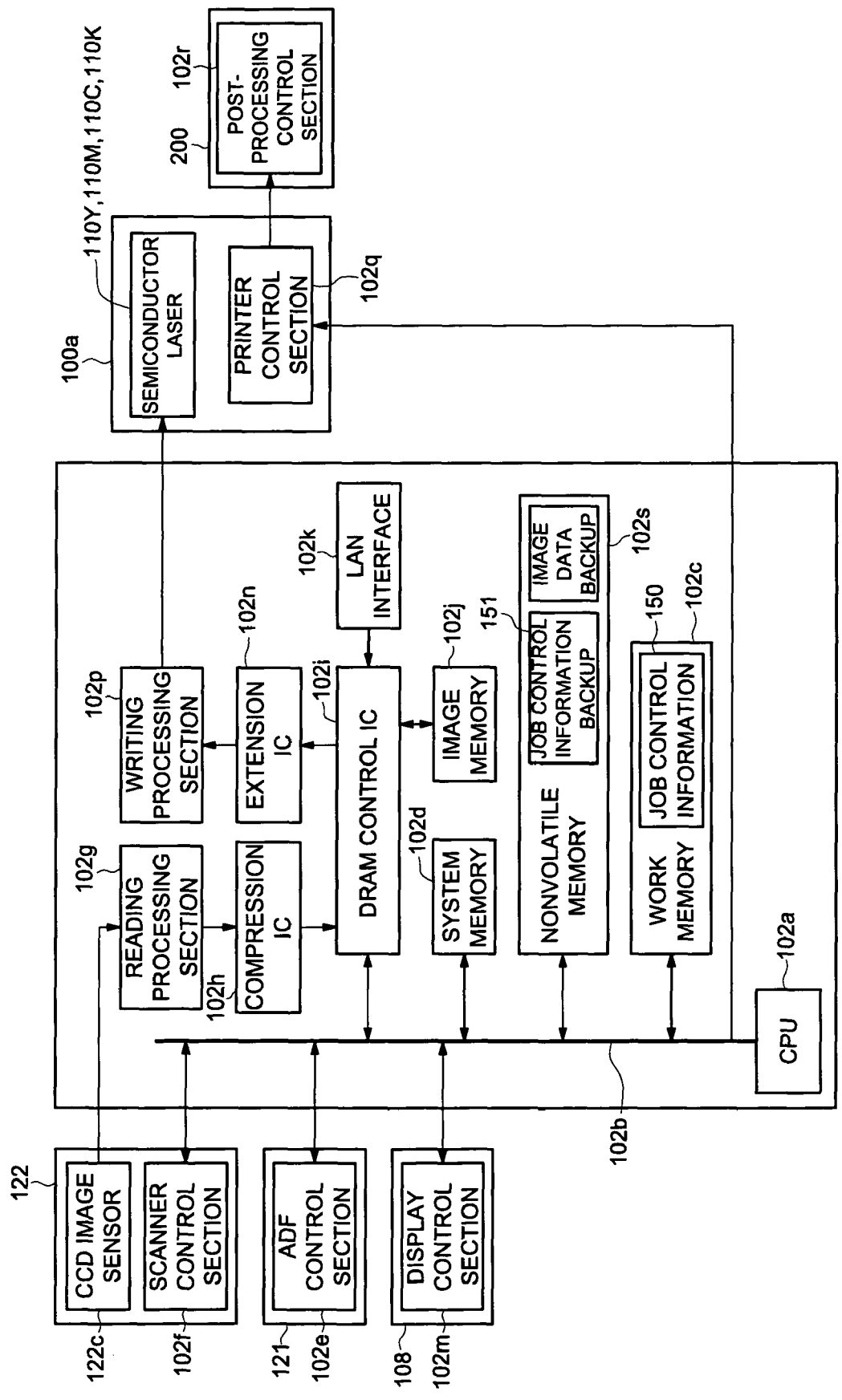
FIG. 2 is a block diagram showing a control system of an image forming apparatus dealing with the first preservation processing for the print job resulting from suspension of the apparatus.

FIG. 2 is a diagram showing the structure of control device 102. The control device 102 is composed of integrated control circuits including CPU (Central Processing Unit) 102a, work memory 102c and system memory 102d, processing circuits, storing circuits, and a control device that controls directly each section of a drive system. The integrated control circuits, processing circuits, other storing circuits and the control device are connected through bus 102b to be capable of inputting and outputting signals, and CPU 102a controls storing circuits and drive mechanism on an integrating basis.

The system memory 102d is a nonvolatile storing circuit and it stores control program that is deciphered and executed by CPU 102a. The work memory 102c is RAM (Random Access Memory) where reading and writing is possible, and programs and data are developed as a work area of CPU 102a.

When reading images, CPU 102a outputs control signals to ADF control section 102e to drive automatic document feeder 121, and outputs control signals to scanner control section 102f to drive document scanning exposure device 122. ADF control section 102e is a control device that drives automatic document feeder 121 in accordance with control signals. The scanner control section 102f is a control device that drives the document scanning exposure device 122 in accordance with control signals.

Image data of analog signals which have been read by CCD image sensor 122c are inputted in reading processing section 102g. The reading processing section 102g is composed of an image processing circuit, and it converts image data of analog signals into digital image data.

Digital image data which have been read are data-compressed by compression IC 102h, and are stored in image memory 102j by writing control of DRAM control IC 102i.

Further, when image data are transmitted from terminals through a network, they are received by LAN interface 102k, and are stored in image memory 102j by writing control of DRAM control IC 102i.

Press-down signals which are outputted from operation panel 108 representing a display device are inputted in CPU 102a through display control section 102m. When image data are outputted onto a sheet, press-down signals showing information of the number of sets and information of instruction for post-processing are outputted from operation panel 108. Information of the number of sets is one indicating the number of sets for printing, while, information of instruction for post-processing is one indicating contents of processing conducted by bookbinding apparatus 200. CPU 102a generates a print job based on information of the number of sets and information of instruction for post-processing inputted from display control section 102m and based on image data stored in image memory 102j, then, controls print job, and controls on an integrating basis so that print jobs may be executed in order.

CPU 102a controls where to preserve image data corresponding to print jobs, order of execution of print jobs, results of print jobs in execution on the way, and controls whether the print job is in execution, or not started or already executed. CPU 102a prepares job control information 150 representing a list of print jobs and stores it in work memory 102c. CPU 102a controls print jobs while referring to job control information 150. After generating print jobs, CPU 102a adds the print jobs to the list of the job control information 150.

Image data corresponding to the print job to be executed are read out from image memory 102j by control of reading of DRAM control IC 102i, then, they are extended by extension IC 102n, and are outputted to writing processing section 102p. CPU 102a instructs DRAM control IC 102i to read out image data corresponding to the print job to be executed by referring to job control information 150. CPU 102a further instructs the aforesaid reading and outputs a start signal to start image forming to printer control section 102q.

After image data are inputted to writing processing section 102p, the writing processing section 102p outputs drive signals having intensity according to a pixel value of each color of image data to semiconductor lasers 110Y, 110M, 110C and 110K, and controls scanning by a laser beam simultaneously.

Printer control section 102q sends drive signals to sheet housing section 103, conveyance path 105, image outputting section 104 and fixing section 106, in synchronization with the control of semiconductor lasers 110Y, 110M, 110C and 110K by writing processing section 102p, and forms images on a sheet.

In this image forming, signals for confirming the completion are outputted from printer control section 102q to CPU 102a each time the image forming for one sheet is completed. Depending on the input of these signals for confirming the completion, CPU 102a refers to the number of sheets outputted, the number of sets outputted and to existence of the instruction for post-processing for the print job in execution in job control information 150, and controls the print job in execution while updating the results in process. After the results of the reference, if the image forming has been completed to the separation of the set, and if the post-processing exists, the start signals to start post-processing are outputted to post-processing control section 102r.

The post-processing control section 102r transmits drive signals to punching section 210, shifting section 211, staple stacker 212 and stapler 214, and causes them to conduct punching or staple binding for a bundle of sheets outputted by image forming apparatus 100, to place the bundle at the prescribed position of sheet ejection.

Progresses of image forming are monitored from terminals on operation panel 108 or on the network. CPU 102a outputs the display data to be displayed on operation panel 108 to display control section 102m, and causes the operation panel 108 to display the results of image forming in process. For example, CPU 102a replaces contents of job control information 150 with character strings for the layout, and outputs them to display control section 102m as display data. Further, for terminals monitoring the progress of image forming on the network, CPU 102a outputs monitoring data corresponding to job control information 150 to LAN interface 102k.

In this case, in the course of image forming, there is an occasion wherein a user stops image forming of image forming apparatus 100, and conducts operations using operation panel 108 to turn off the power. There is further an occasion wherein signals to stop image forming of image forming apparatus 100 and to turn off the power are outputted from a terminal on the network. There is also an occasion wherein a timer provided in image forming apparatus 100 stops image forming automatically and turns the power off. CPU 102a continues image forming up to the separation of a set of the print job in execution, by referring to job control information 150, before shifting the control to the condition to turning off powers. And then, it copies job control information 150 and image data in image memory 102j to cause nonvolatile memory 102s to store job control information backup 151 and image data backup, and after that, CPU 102a conducts the control to turn the power off. The nonvolatile memory 102s is a nonvolatile storing medium, and data stored therein are not lost even if the power is turned off.

When the power is turned on again, nonvolatile memory 102s is consulted, and if job control information backup 151 exists, the job control information backup 151 is moved to work memory 102c to become job control information 150, and backup of image data is moved to image memory 102j, whereby, image forming in accordance with job control information 150 is restarted.

FIG. 3 is a diagram showing an example of the structure of data for job control information 150 consulted by CPU 102a. The job control information 150 houses, for each print job, job number 150a, start information 150b, output page information 150c, output set number information 150d, post-processing instruction information 150e, finish information 150f and address information 150g, so that they may be corresponded to each other.

The start information 150b shows whether image forming is started or not. The output page information 150c shows the page number on which the image forming was completed, among the number of pages to be subjected to image forming. This output page information 150c is composed of total number of pages to be subjected to image forming and the number of finished pages for which the image forming has been completed, and a value on the right side of a diagonal line shows the total number of pages, while, a value on the left side of a diagonal line shows the number of finished pages in terms of image forming. The output set number information 150d shows the set number on which the image forming was completed, among the number of sets to be subjected to image forming. This output set number information 150d is composed of total number of sets to be subjected to image forming and the number of sets for which the image forming has been completed, and a value on the right side of a diagonal line shows the total number of sets, while, a value on the left side of a diagonal line shows the number of finished sets in terms of image forming. The post-processing instruction information 150e shows contents of post-processing carried out on bookbinding apparatus 200. The finish information 150f shows whether image forming has been finished or not. The address information 150g shows an address of a location where image data for image forming in the print job are stored.

When image data are read out, or when image data are received through the network, CPU 102a adds job number 150a newly, then, stores "0" showing NOT STARTED in start information 150b, and stores "0" showing NOT FINISHED in finish information 150f. A print job of NOT STARTED is also called a reserved job. Further, the number of pages is counted from obtained image data group, then, a value corresponding to the total number of pages thus counted is stored in output page information 150c, and "0" is stored as the number of finished pages. Further, CPU 102a refers to operations inputted by the use of operation panel 108 at the time of obtaining image data and refers to control information attached to the image data, and stores the number of sets instructed to output in output set number information 150d, and when post-processing is instructed, CPU 102a stores contents of instructed post-processing in post-processing instruction information 150e. Then, it controls DRAM control IC 102i to cause image data to be stored in image memory 102j, and stores a forefront address and a tail address where image data are stored in address information 150g.

For example, a print job wherein "1" is stored in job number 150a is finished in terms of all image forming operations, and "1" showing FINISHED is stored in finish information 150f. A print job wherein "2" is stored in job number 150a is a print job in execution wherein not all image forming operations are finished although image forming has been started, and "1" showing the start of image forming is stored in start information 150b and "0" showing NOT FINISHED of image forming is stored in finish information 150f.

In the print job in execution wherein "2" is stored in job number 150a, "50" showing the total number of outputted pages is stored on the right side of a diagonal line in output page information 150c. On the other hand, "48" showing the number of currently outputted pages is stored on the left side of the diagonal line in output page information 150c, indicating that image forming is on the way of the set. For this print job in execution, "1" showing that stapling processing is conducted is stored in post-processing instruction information 150e.

Figure 4:
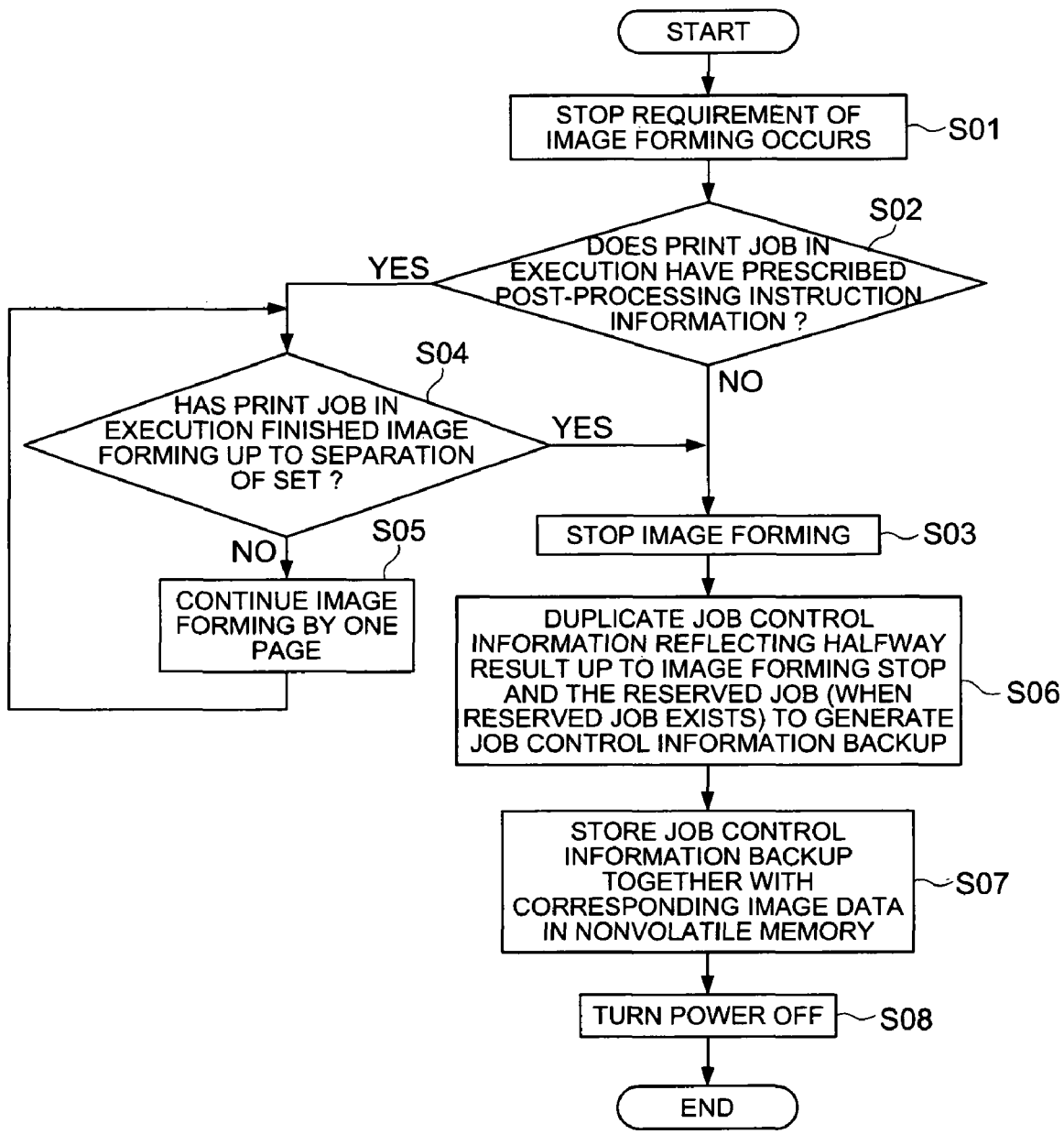
FIG. 4 is a flow chart showing operations of the first preservation processing for the print job resulting from suspension of the apparatus.

FIG. 4 is a flow chart showing the flow of image forming discontinuation accompanied by the power off. This processing is realized when CPU 102a reads out control program from system memory 102d to execute it.

When image forming is requested to be discontinued (S01), CPU 102a first refers to job control information 150. The request of discontinuation of image forming is caused by operations of the power off with the use of operation panel 108, control signals for the power off through network, or by the start of automatic power off event at the moment arriving at the time to turn off the power. Here, the case where this power off control is carried out during image forming will be described.

CPU 102a reads out a column of print job in execution from job control information 150, and judges whether prescribed post-processing instruction information 150e exists on the print job in execution or not (S02). The column of print job in execution is a column wherein start information 150b is "1" showing START, and finish information 150f is "0" showing NOT FINISHED. It is judged whether a value showing conducting prescribed post-processing is stored in post-processing instruction information 150e in the column of print job or not.

The prescribed post-processing instruction information 150e is information showing post-processing in which the post-processing to a unit as a set is essential. The post-processing is roughly divided into processing to be provided to a bundle of prints and processing to be provided to each sheet. For example, stapling, saddle stitching, lap center folding, lap three-folding, and wrapping binding represent processing to be provided to a bundle of prints. On the other hand, three-folding is a processing to be provided to each sheet. In other words, CPU 102a judges whether a value other than "0" and other than a value showing post-processing to be given to a single sheet, namely a value indicating post-processing applied to a bundle of prints, is stored in post-processing instruction information 150e or not.

As a result of the judgment, if prescribed post-processing instruction information 150e does not exist (S02, No), CPU 102a causes image forming to be stopped promptly (S03). In the processing of discontinuation of image forming, CPU 102a stops outputting of control signals for image data reading and output of writing processing section 102p to DRAM control IC 102i, and stops outputting of control signals for driving a drive system to printer control section 102q.

As a result of the judgment, if prescribed post-processing instruction information exists (S02, Yes), CPU 102a reads out a column of print job in execution from job control information 150, and judges whether image forming has ended up to the separation of the set in the print job in execution or not (S04). Whether image forming has ended up to the separation of the set or not can be judged by judging whether the total number of pages stored in output page information 150c agrees with a value shown by the number of finished pages or not. If the total number of pages agrees with a value shown by the number of finished pages, it shows that image forming has been finished up to the separation of the set. If the total number of pages does not agree with a value shown by the number of finished pages, it shows that image forming is on the way of the set.

If the output page information 150c of the print job in execution shows the separation of the set (S04, Yes), CPU 102a stops image forming promptly (S03). When image forming is stopped, CPU 102a updates job control information 150 in accordance with the progress of the image forming. In other words, CPU 102a counts up by one for output set number information 150d in a column of print job in execution of job control information 150, and initializes the number of finished pages of the output page information 150c to be 0. When the total number of sets agrees with the number of sets for which the image forming has been completed in the output set number information 150*d* before counting up, finish information 150*f* of a column of the print job in execution is updated to "1" showing FINISHED.

If the output page information 150*c* of the print job in execution does not show the separation of the set (S04, No), image forming for one page is continued (S05). As far as the output page information 150*c* of the print job in execution does not show the separation of the set (S04, No), image forming for one page (S05) is repeated in succession. While the image forming is continued, CPU 102*a* receives signals for confirming the completion each time the image forming for one page is terminated. Then, corresponding to each receiving of signals for confirming the completion, CPU 102*a* counts up by one for the number of finished pages of the output page information 150*c* in a column of print job in execution.

After the discontinuation of image forming (S03), CPU 102*a* duplicates the job control information 150 reflecting the result on the way up to the discontinuation of image forming and also the reserved job, if the reserved job exists, to generate job control information backup 151 (S06), and stores it in nonvolatile memory 102*s* together with corresponding image data (S07).

After causing the job control information backup 151 to be stored in the nonvolatile memory 102*s*, CPU 102*a* controls a power supply device for image forming apparatus 100 to turn off the power (S08).

Figure 5:
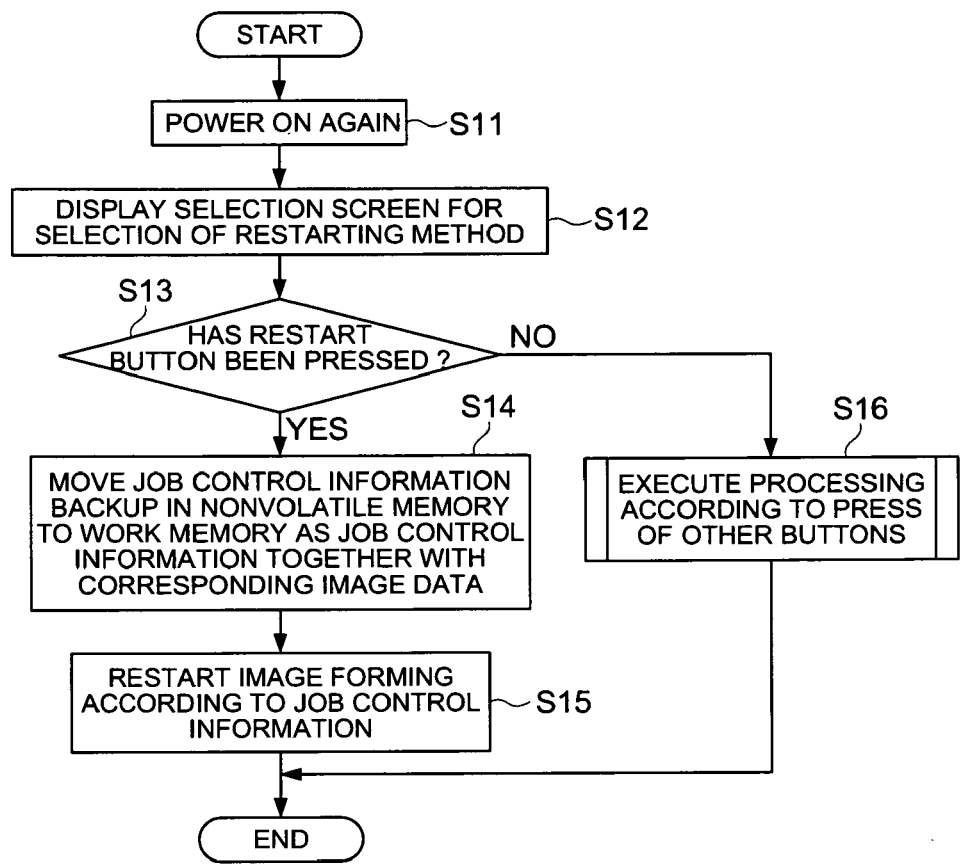
FIG. 5 is a flow chart showing operations of the print job restart processing after the apparatus suspension that is accompanied by print job preservation.

Next, FIG. 5 is a flow chart showing the flow of restarting of image formation in the case where image forming is discontinued after forming images up to the separation of the set and the power is turned off.

After the power for image forming apparatus 100 is turned on again (S11), CPU 102*a* outputs the display data for a selection screen that urges a selection of a restarting method to display control section 102*m*, and causes operation panel 108 to display a selection screen that urges a selection of a restarting method (S12).

Figure 6:
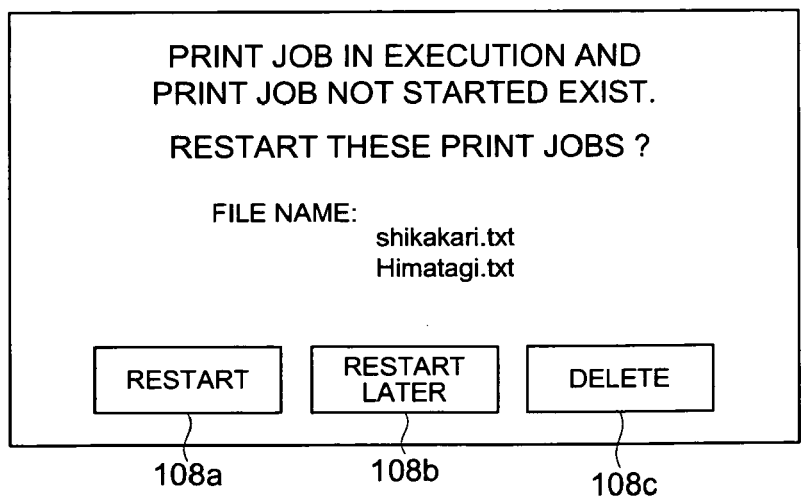
FIG. 6 is a diagram showing a selection screen displayed in operations for print job restart processing.

FIG. 6 is a pattern diagram showing a selection screen that urges a selection of a restarting method. On the selection screen displayed on operation panel 108 by turning power on again, there are displayed character strings saying that the print job in execution and reserved job that is not started are present, and character strings asking whether to restart the print job in execution or not, and further file names for recognizing the print job in execution and the reserved job that is not started. On the lower part of the selection screen, there are displayed restart button 108*a* corresponding to an input for restarting, restart later button 108*b* corresponding to an input for restarting later and delete button 108*c* corresponding to an input for deleting print job in execution and print job that is not started.

When an area where restart button 108*a* is drawn is pressed down, press-down signals indicating restarting are inputted in CPU 102*a*, when an area where restart later button 108*b* is drawn is pressed down, press-down signals indicating restarting later are inputted in CPU 102*a*, and when an area where delete button 108*c* is drawn is pressed down, press-down signals indicating deleting are inputted in CPU 102*a*.

If a user presses down the restart button 108*a* in conformity to the selection screen (S13, Yes), CPU 102*a* moves job control information backup 151 from nonvolatile memory 102*s* to work memory 102*c* as job control information 150, together with corresponding image data (S14). If job control information 150 identical to the content of job control information backup 151 is stored in work memory 102*c*, CPU 102*a* restarts image forming in accordance with job control information 150 (S15).

Figure 7:
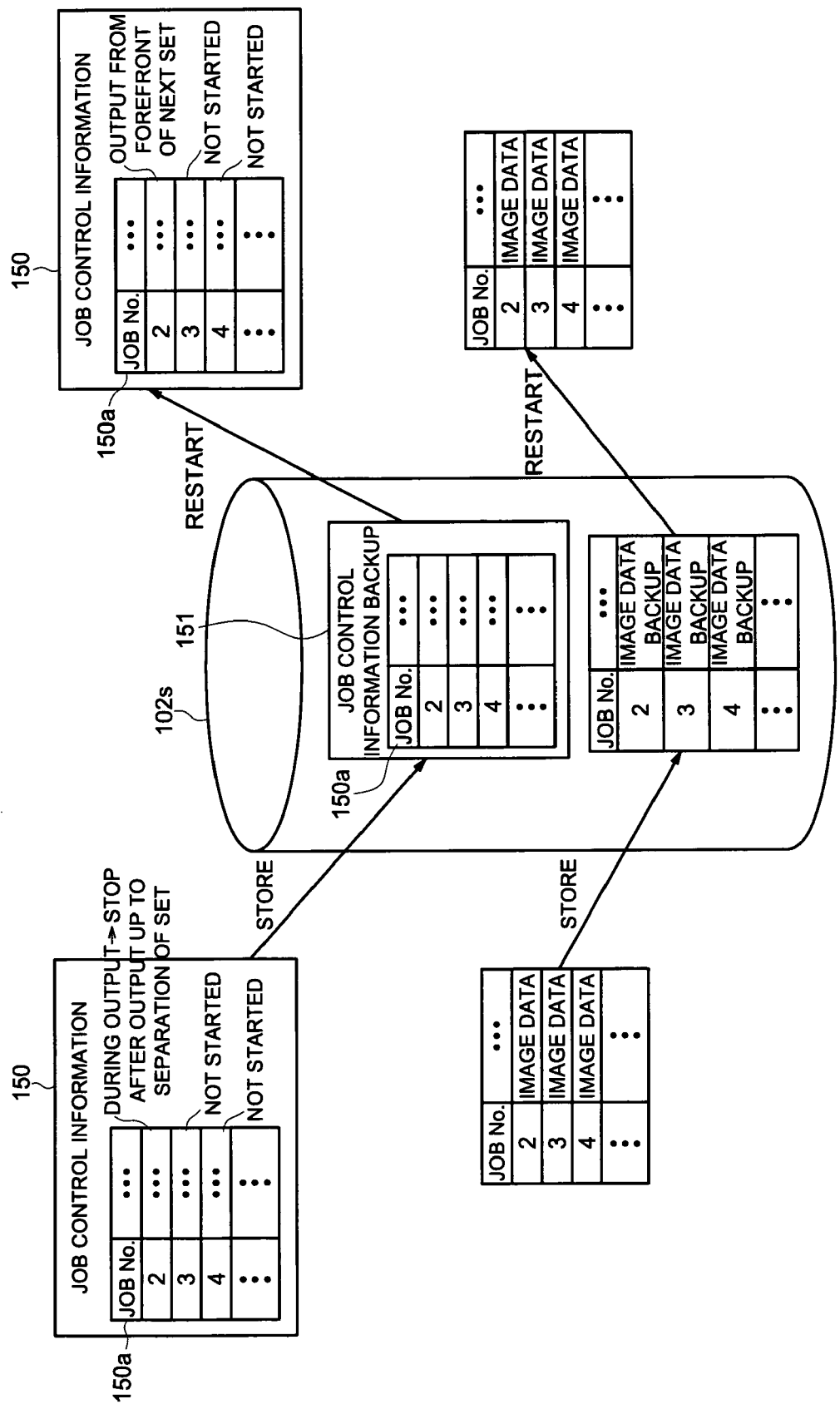
FIG. 7 is a pattern diagram showing print job preservation state and restart state in operations for the first preservation processing.

FIG. 7 is a pattern diagram showing print job preservation state and restart state. Before the power is turned off, image forming is discontinued after images are formed up to the separation of the set for the print job in execution shown with "2" as job number 150*a*, job control information 150 including contents of a reserved job that is not started are stored in nonvolatile memory 102*s* together with the print job in execution as job control information backup 151. In other words, job control information backup 151 is a backup of job control information 150 for remaining results on the way where image forming has been conducted up to the separation of the set before the power is turned off. Therefore, if this job control information backup 151 is moved to work memory 102*c* as job control information 150, the image forming thus restarted is started again from the forefront of the succeeding set or from the beginning of the succeeding print job.

If a user presses down restart later button 108*b* and delete button 108*c* other than restart button 108*a* in conformity to the selection screen (S13, No), CPU 102*a* executes processing following the press-down signals (S16). In the case of pressing down the restart later button 108*b*, if new print job is inputted, the new print job is executed with job control information backup 151 remaining on nonvolatile memory 102*s*. In the case of pressing down delete button 108*c*, job control information backup 151 and corresponding image data stored in nonvolatile memory 102*s* is deleted.

Figure 8:
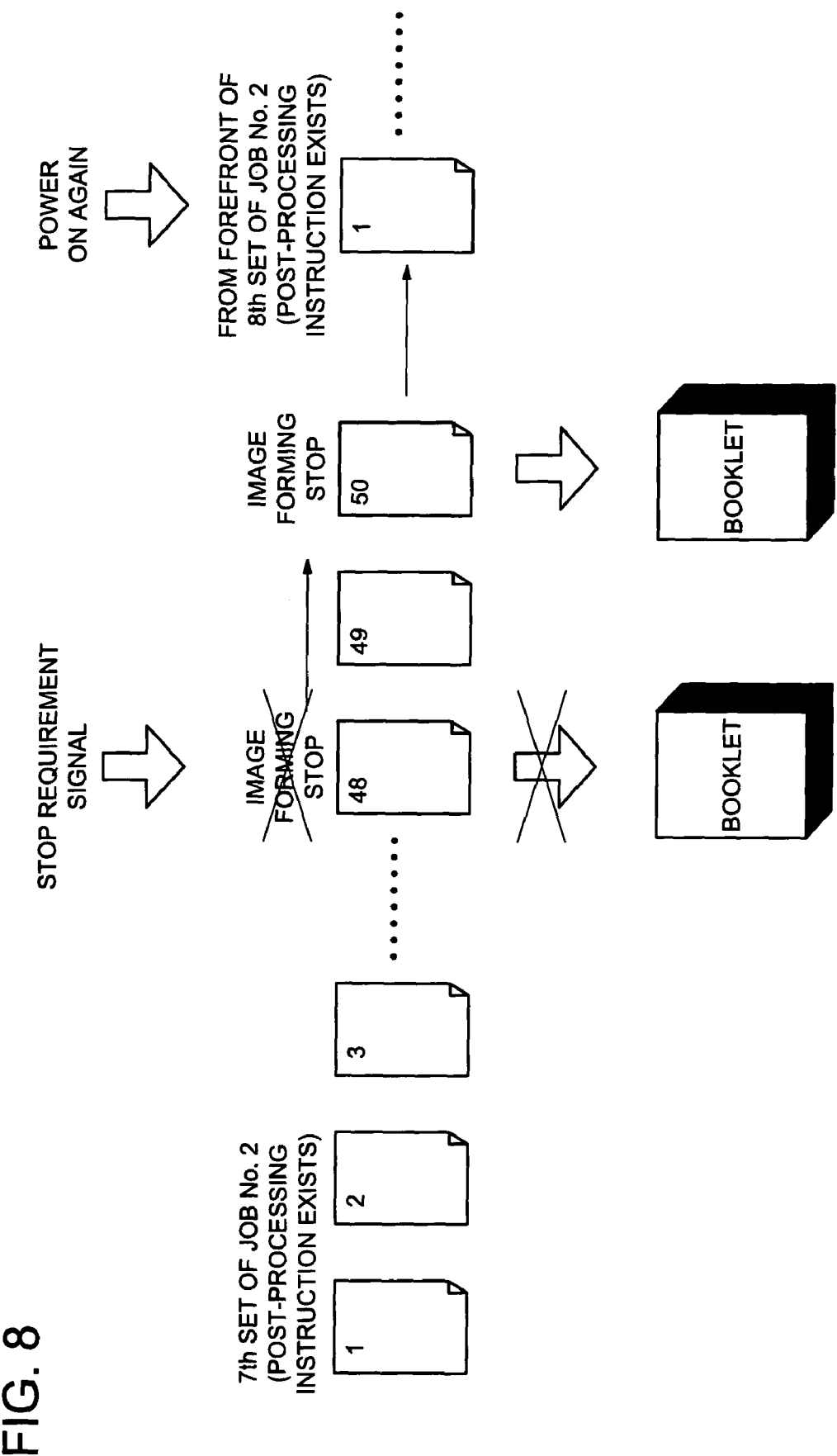
FIG. 8 is a pattern diagram showing condition for execution of the print job resulting from suspension of the apparatus.

Specific examples of discontinuation and restarting of the print job on image forming apparatus 100 of the present embodiment will be, shown below. FIG. 8 is a pattern diagram showing condition for execution of the print job resulting from suspension of the apparatus.

In the course of execution of the print job in which "2" is stored in job number 150*a* in job control information 150 shown in FIG. 3, when image forming is finished up to "48" page of the 7th set out of total 12 sets as shown in FIG. 8, it is assumed that signals for requesting discontinuation of image forming are outputted from operation panel 108, because a user operates to turn off the power by using, for example, the operation panel 108.

In the conventional image forming apparatus wherein image forming is discontinued immediately, image forming is discontinued even on the way of the set, because image forming is discontinued soon after image forming is finished up to 48th page. Therefore, the 7th set is divided into a portion including the 1st to 48th pages before the power off and a portion including 49th and 50th pages after the power off, thus, stapling processing cannot be carried out, or the portion of 1st to 48th pages is stapled, resulting in impossibility of making booklets. Namely, the 7th set turns out to be useless. A user needs to try image forming again for the 7th set to complete the total number of sets desired.

On the other hand, in the image forming apparatus 100 of the present embodiment, when signals for requesting discontinuation are outputted at the point of time when image forming up to "48th" page of the 7th set out of the total 12 sets is finished, post-processing instruction information 150*e* is referred from the list in which job number 150*a* corresponding to the print job in execution presently in job control information 150 is "2". As a result of the reference, "1" showing the execution of stapling processing is stored in the post-processing instruction information 150*e*. Because of this prescribed post-processing instruction, output page information 150*c* is referred next from the list in which the job number 150*a* is "2". As a result of the reference, it is shown that the 7th set has been finished up to page number of "48" for the total page number "50" and the set is on its half way, and therefore the image forming is continued.

When the number of finished pages is counted up each time finish confirmation signals are outputted, and if the 7th set arrives at the finished page number "50" for the total page number "50", it shows that image forming has been carried out up to the separation of the set, thus, the image forming is discontinued. Since all pages of the 7th set are subjected to image forming, the 7th set is subjected to stapling processing by bookbinding apparatus 200 to be completed as a booklet. That is, image processing does not need to be tried again on the 7th set.

Then, outputted page number "0" is stored in output page information 150c in the list in which the job number 150a is "2", and then, counts up the number of outputted sets of output set number information 150d by one and stores "8". This updated job control information 150 is caused to be stored in nonvolatile memory 102s as job control information backup 151. After the storage of the job control information backup 151 in nonvolatile memory 102s is terminated, the power is turned off.

After power on again, in the list in which job number 150a is "2", finished page number "0" is stored in output page information 150c, and "8" is stored in the outputted number of sets of output set number information 150d, thus, image forming is restarted from the forefront of the 8th set.

In the image forming apparatus 100 of the present embodiment, as stated above, image forming is discontinued after conducting image forming up to the separation of the set in the course of image forming, then, reserved job in which image forming is not finished including print job in execution is stored as job control information backup 151 in nonvolatile memory 102s, and the image forming is restarted based on the print job corresponding to the job control information backup 151 stored in the nonvolatile memory 102s.

Therefore, even in the case of restarting image forming after discontinuing it, no wasteful outputted item is generated, and a period of time to try again for the wasteful outputted item can be saved, which results in excellent productivity. In particular, the foregoing is effective for the occasion wherein post-processing operations such as processes of stapling, saddle stitching, lap folding, lap three-folding, and wrapping binding are conducted on bundles of prints for making booklets.

Further, in the case of power on again, it is not necessary to urge a selection whether to try again from the page on the way or to try again from the set on the way, therefore, even when a person who uses the image forming apparatus first after power on again is different from a person who requested the print job in execution before the discontinuation, there is no confusion for the selection of a restarting method.

Second Embodiment

Figure 9:
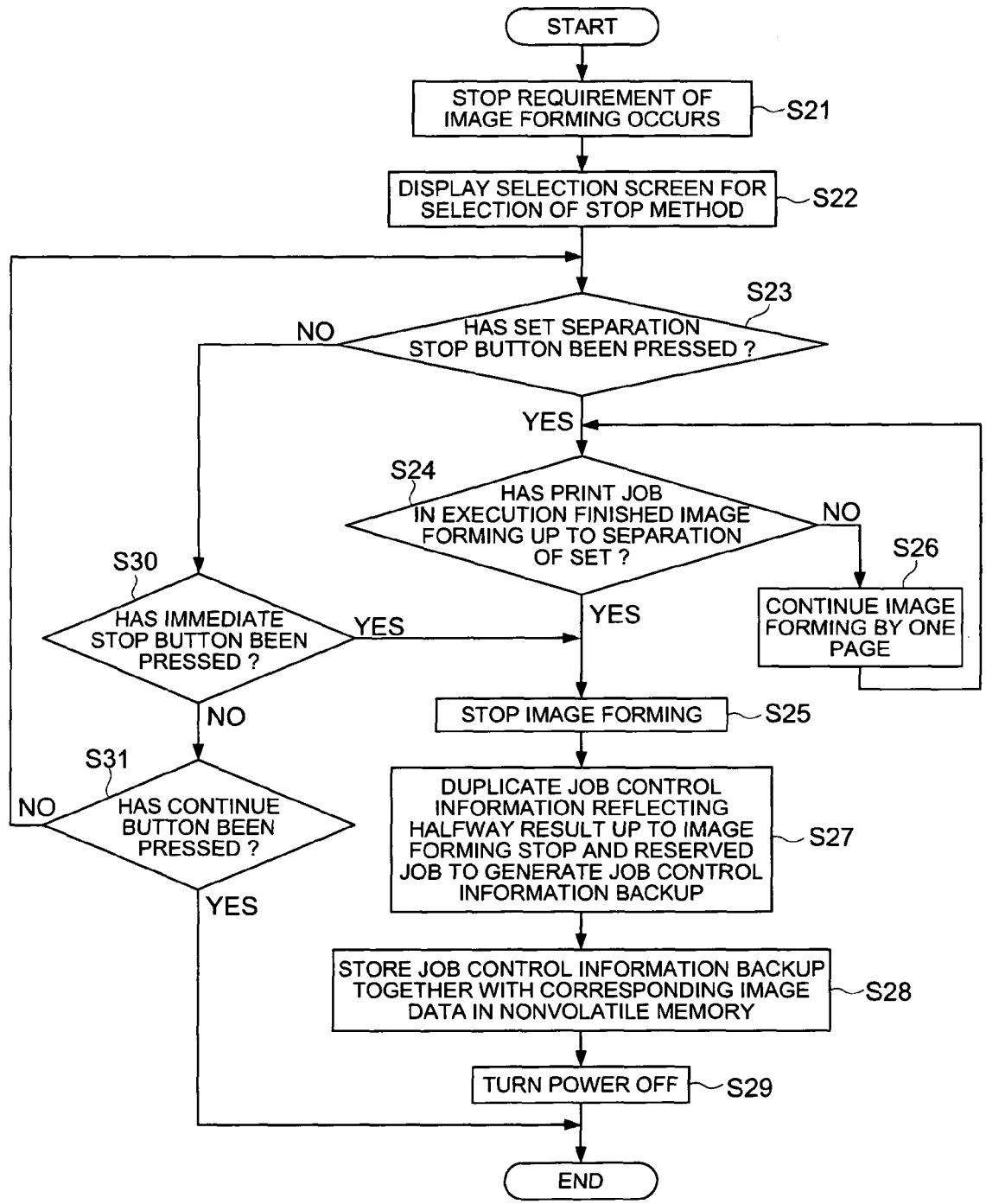
FIG. 9 is a flow chart showing operations of the second preservation processing for the print job resulting from suspension of the apparatus.

Next, there will be shown a variation of discontinuation of image forming accompanied by the power off for image forming apparatus 100. In this variation, it is possible to continue image forming up to the separation of the set, regardless of presence or absence of prescribed post-processing, and to discontinue the image forming. FIG. 9 is a flow chart showing the second flow of image forming discontinuation accompanied by the power off. This processing can be realized when CPU 102a reads out a control program from system memory 102d to execute it. Here, the case where power off control is carried out during image forming and the image forming is requested to be discontinued will be described.

If a request for discontinuing image forming is generated (S21), CPU 102a outputs, to display control section 102m, the display data of selection screen that urges selection of a method of discontinuation, and causes operation panel 108 to display the selection screen that urges selection of a method of discontinuation (S22).

Figure 10:
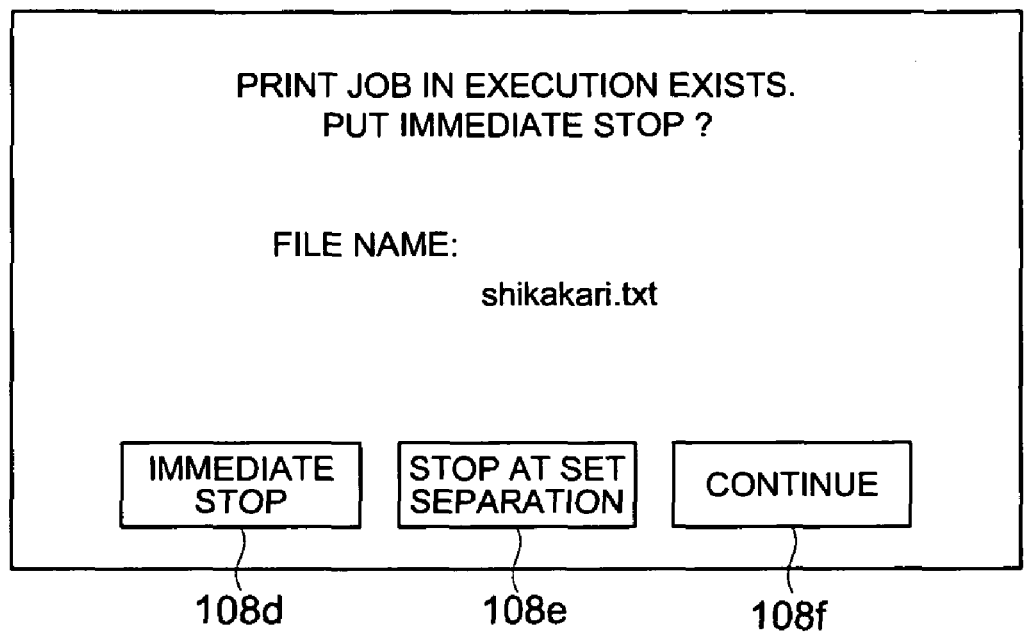
FIG. 10 is a diagram showing a selection screen displayed in operations for the first preservation processing.

FIG. 10 is a pattern diagram showing a selection screen that urges selection of a method of discontinuation. As shown in FIG. 10, on the selection screen representing a selection receiving section displayed on operation panel 108, there are displayed character strings showing existence of print job in execution, character strings for asking whether to discontinue image forming immediately or not, and a file name discriminating print job in execution. On the lower part of the selection screen, there are displayed immediate stop button 108d corresponding to input for discontinuing immediately, set-separation stop button 108e corresponding to input for continuing image forming up to separation of a set and continue button 108f corresponding to input for canceling the discontinuation.

When an area where the set-separation stop button 108e is drawn is pressed down, press-down signals indicating that image forming is continued up to a separation of the set are inputted in CPU 102a, when an area where the immediate stop button 108d is drawn is pressed down, press-down signals indicating that image forming is discontinued even on the way of the set are inputted in CPU 102a, and when an area where the continue button 108f is drawn is pressed down, press-down signals indicating that the discontinuation is canceled are inputted in CPU 102a.

If a user presses down the set-separation stop button 108e in conformity to the selection screen (S23, Yes), CPU 102a reads a column of print job in execution out of job control information 150, and judges whether the image forming is over up to the separation of the set in the print job in execution or not (S24).

If output page information 150c of the print job in execution indicates the separation of the set (S24, Yes), CPU 102a discontinues image forming immediately (S25). When the image forming is discontinued, CPU 102a updates job control information 150 in accordance with progress of the image forming. In other words, CPU 102a counts up by one for output set number information 150d in a column of print job in execution of job control information 150, and initializes the number of finished pages of the output page information 150c to be 0. When the total number of sets agrees with the number of sets for which the image forming has been completed in the output set number information 150d before counting up, finish information 150f of a column of the job in execution is updated to "1" showing FINISHED.

If the output page information 150c of the print job in execution does not indicate the separation of the set (S24, No), image forming for one page is continued (S26). As far as the output page information 150c of the print job in execution does not indicate the separation of the set (S24, No), image forming for one page (S26) is repeated in succession. While the image forming is continued, CPU 102a receives signals for confirming the completion each time the image forming for one page is completed. Then, corresponding to each receiving of signals for confirming the completion, CPU 102a counts up by one for the number of finished pages of the output page information 150c in a column of print job in execution.

After the discontinuation of image forming (S25), CPU 102a duplicates the job control information 150 reflecting the result on the way up to the discontinuation of image forming and a reserved job, to generate job control information backup 151 (S27), and stores it in nonvolatile memory 102s together with corresponding image data (S28).

After causing the job control information backup 151 to be stored in the nonvolatile memory 102s, CPU 102a controls a power supply device for image forming apparatus 100 to turn off the power (S29).

If the immediate stop button 108d is pressed down by a user in conformity to the selection screen (S23, No and S30, Yes), image forming is discontinued immediately (S25), and S27-S29 are executed. Further, if the continue button 108f is pressed down by a user in conformity to the selection screen (S23, No and S30, No and S31, Yes), image forming discontinuation processing is terminated.

As stated above, it is possible to conduct image forming up to the separation of the set, even by a method to allow a user to select a discontinuation method, and no wasteful outputted item is generated, whereby, it is possible to save time to try again separately to replace the wasteful outputted item, which results in excellent productivity. In this case, it is especially effective when conducting image forming for plural sets each being an outputted item having plural pages, and having no prescribed post-processing.

Further, in the case of power on again, it is not necessary to urge a selection whether to try again from the page on the way or to try again from the set on the way, therefore, even when a person who uses the image forming apparatus first after power on again is different from a person who requested the print job in execution before the discontinuation, there is no confusion for the selection of a restarting method.

Further, although it is also possible to urge selection of a method of discontinuation every time by displaying a selection screen that urges selection of a method of discontinuation, it is also possible to store the selected method of discontinuation in nonvolatile memory 102s in advance, and thereby to discontinue image forming complying with the method of discontinuation stored in the nonvolatile memory 102s, thereafter.

What is claimed is:

1. An image forming apparatus comprising:
    an image outputting section for conducting image forming on a sheet;
    a nonvolatile storing medium for storing a print job; and
    a control section for conducting:
        a control to discontinue the image forming at a stop point after continuing the image forming up to an end of a set in process of the image forming based on job information of the print job when the image forming for the print job in execution is discontinued in mid course;
        a control to store the job information reflecting a halfway result up to the stop point in the nonvolatile storing medium after the discontinuation of the image forming and before turning power off; and then
        a control to read out the job information reflecting the halfway result up to the stop point and to restart to continue the print job corresponding to the job information from the stop point when the power is turned on again, the job information being stored in the nonvolatile storing medium.

2. The image forming apparatus of claim 1, wherein the job information of the print job includes a total page number per set and a finished page number.

3. The image forming apparatus of claim 1, further comprising:
    a selection receiving section for allowing an operator to decide whether to select setting of a halfway stop of the set or to select setting of a stop at the end of the set as a stop method of image forming,
    wherein the control section controls the image forming to discontinue even if the image forming is in mid course of the set when the setting of the halfway stop of the set is selected in the selection receiving section, and the control section controls the image forming to discontinue after continuing the image forming up to the end of the set in process of the image forming when the setting of the stop at the end of the set is selected in the selection receiving section.

4. The image forming apparatus of claim 1, wherein the job information includes a post-processing instruction information as information for post-processing to be applied to the sheet after the image forming, and
    wherein the control section judges whether or not the print job in execution includes prescribed information of the post-processing instruction information, and the control section performs control so that if the print job in execution does not include the prescribed post-processing instruction information, the image forming is discontinued even if the image forming is in mid course of the set, and if the print job in execution includes the prescribed post-processing instruction information, the image forming is continued up to the end of the set in process of the image forming and then the image forming is discontinued.

5. The image forming apparatus of claim 1, further comprising:
    a display section; and
    a display control section for displaying, in the display section, a selection screen prompting a viewer to decide whether or not to select restarting of the print job corresponding to the job information after the power is turned on again, if the job information reflecting the halfway result up to the stop point exists in the nonvolatile storing medium,
    wherein the control section performs control so as to read out the job information reflecting the halfway result up to the stop point, and to continue the print job corresponding to the job information from the stop point when the restarting of the print job corresponding to the job information is selected based on the selection screen displayed in the display section, the job information being stored in the nonvolatile storing medium.

6. An image forming apparatus comprising:
    an image outputting section for conducting image forming on a sheet;
    a nonvolatile storing medium for storing a print job; and
    a control section for conducting:
        a control to: (i) selectively discontinue the image forming at a stop point even if the image forming is in mid course of a set, and (ii) selectively discontinue the image forming at a stop point after continuing the image forming up to an end of the set in process of the image forming, when the image forming for the print job in execution is discontinued in mid course, wherein the discontinuation of the image forming after continuing the image forming up to the end of the set is based on job information of the print job;
        a control to store the job information reflecting a halfway result up to the stop point in the nonvolatile storing medium after the selected discontinuation of the image forming and before turning power off; and then
        a control to read out the job information reflecting the halfway result up to the stop point and to restart to continue the print job corresponding to the job information from the stop point when the power is turned on again, the job information being stored in the nonvolatile storing medium.

7. The image forming apparatus of claim 6, wherein the job information of the print job includes a total page number per set and a finished page number.

8. The image forming apparatus of claim 6, further comprising:
   a selection receiving section for allowing an operator to decide whether to select setting of a halfway stop of the set or to select setting of a stop at the end of the set as a stop method of image forming,
   wherein the control section controls the image forming to discontinue even if the image forming is in the mid course of the set when the setting of the halfway stop of the set is selected in the selection receiving section, and the control section controls the image forming to discontinue after continuing the image forming up to the end of the set in process of the image forming when the setting of the stop at the end of the set is selected in the selection receiving section.

9. The image forming apparatus of claim 6, wherein the job information includes a post-processing instruction information as information for post-processing to be applied to the sheet after the image forming, and
   wherein the control section judges whether or not the print job in execution includes prescribed information of the post-processing instruction information, and the control section performs control so that if the print job in execution does not include the prescribed post-processing instruction information, the image forming is discontinued even if the image forming is in the mid course of the set, and if the print job in execution includes the prescribed post-processing instruction information, the image forming is continued up to the end of the set in process of the image forming and then the image forming is discontinued.

10. The image forming apparatus of claim 6, further comprising:
    a display section; and
    a display control section for displaying, in the display section, a selection screen prompting a viewer to decide whether or not to select restarting of the print job corresponding to the job information after the power is turned on again, if the job information reflecting the halfway result up to the stop point exists in the nonvolatile storing medium,
    wherein the control section performs control so as to read out the job information reflecting the halfway result up to the stop point, and to continue the print job corresponding to the job information from the stop point when the restarting of the print job corresponding to the job information is selected based on the selection screen displayed in the display section, the job information being stored in the nonvolatile storing medium.

* * * * *